(12) United States Patent
Piana

(10) Patent No.: US 6,404,183 B1
(45) Date of Patent: Jun. 11, 2002

(54) MAGNETOSTRICTIVE POSITION MEASURING DEVICE WITH HIGH MEASUREMENT PRECISION

(76) Inventor: Ermete Piana, Via Duome, 23, 25049 Iseo (IT)

( * ) Notice: Subject to any disclaimer, the term of this patent is extended or adjusted under 35 U.S.C. 154(b) by 0 days.

(21) Appl. No.: 09/489,918

(22) Filed: Jan. 24, 2000

(30) Foreign Application Priority Data

Jun. 11, 1999 (IT) .......................................... MI99A1313

(51) Int. Cl.[7] ................................................. G01B 7/14
(52) U.S. Cl. .............................. 324/207.13; 324/207.24
(58) Field of Search ........................ 324/207.13, 207.24; 367/127; 73/290 V, 314; 333/148

(56) References Cited

U.S. PATENT DOCUMENTS

| | | | | |
|---|---|---|---|---|
| 3,898,555 A | * | 8/1975 | Tellerman | 324/207.13 |
| 4,654,590 A | | 3/1987 | Kitaura | 324/208 |
| 5,070,485 A | | 12/1991 | Nyce | 367/127 |
| 5,804,961 A | * | 9/1998 | Castillo et al. | 324/207.13 |

FOREIGN PATENT DOCUMENTS

DE 42 44 204 6/1994

* cited by examiner

*Primary Examiner*—Jay Patidar
(74) *Attorney, Agent, or Firm*—Sughrue Mion, PLLC

(57) ABSTRACT

A magnetostrictive position measuring device with high measurement precision, comprising a containment tube which accommodates a magnetostrictive tube inside which a conducting wire is accommodated, a transducer device being provided at one end of the magnetostrictive tube and an evaluating device for evaluating the signal acquired by the transducer device being connected to the transducer device. The magnetostrictive tube is connected to the containment tube by a conducting device which is suitable to provide electrical continuity between the conducting wire accommodated in the magnetostrictive tube and the containment tube.

7 Claims, 1 Drawing Sheet

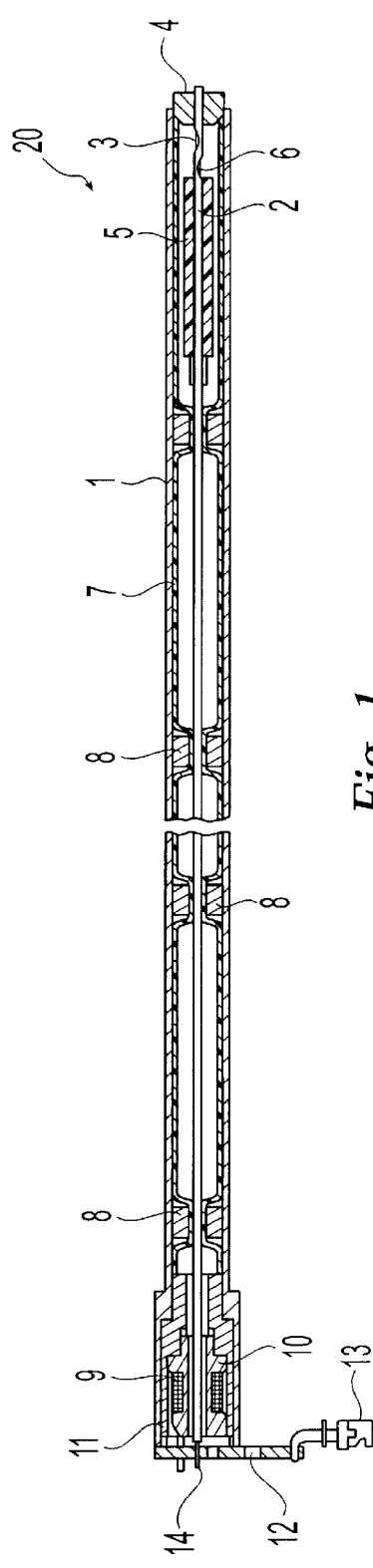
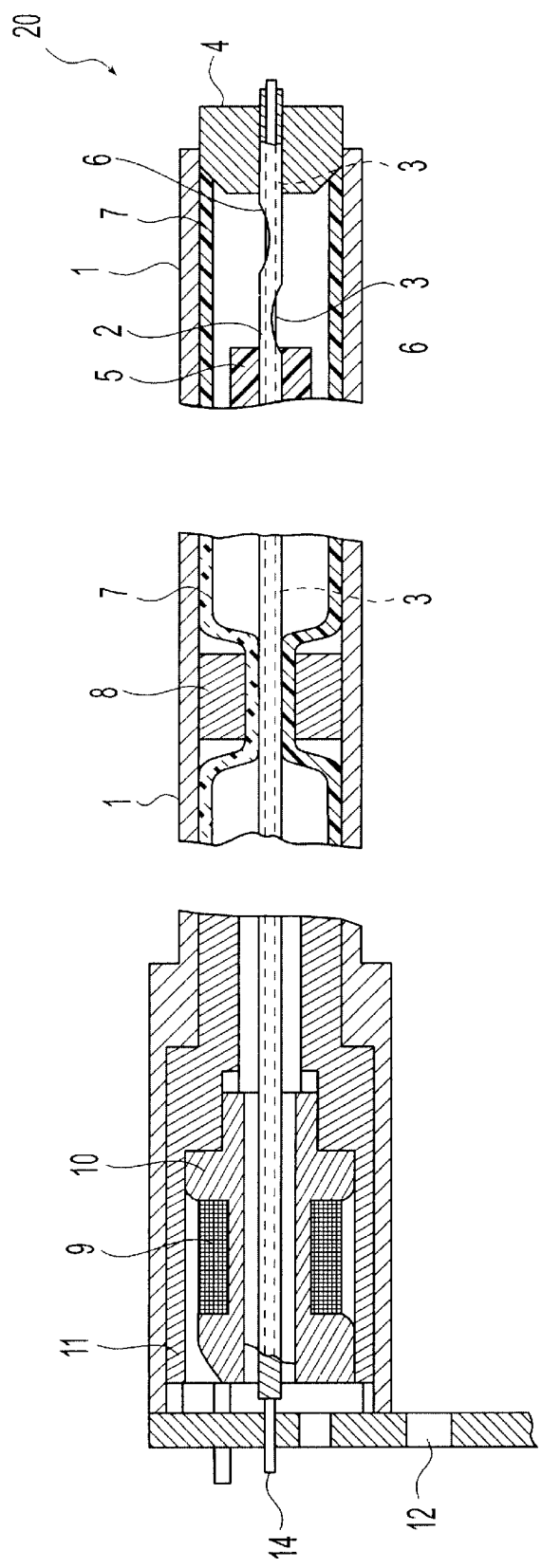
Fig. 1
Fig. 2

MAGNETOSTRICTIVE POSITION MEASURING DEVICE WITH HIGH MEASUREMENT PRECISION

BACKGROUND OF THE INVENTION

The present invention relates to a magnetostrictive transducer with high measurement precision. More particularly, the invention relates to a magnetostrictive transducer which offers simplified construction and improved measurement precision with respect to conventional transducers.

Magnetostrictive transducers are transducers which are usually used to measure a position by using a position marker of the magnetic type.

In particular, a transducer of the above-cited type comprises a tube made of a special alloy which is crossed by a copper conductor to which a current pulse is applied. The copper conductor must carry the current pulse from one end of the alloy tube to the other and return the current pulse to the point of origin in order to close the circuit.

A position marker (permanent magnet) determines the measurement of the position of the work area of the transducer. The field lines of the position marker are perpendicular to the rotational field generated by the current pulse in the alloy tube and also concentrate in the measurement point. In that point, the magnetic fields interact and induce, in the microzone of the structure, a torsional elastic deformation due to a magnetostrictive effect. This deformation is in every respect a torsional mechanical wave which propagates in the two directions of said tube. At one end, propagation of the mechanical wave is damped by adapted damping means, whereas at the opposite end the mechanical wave is detected by means of an inductive pickup and converted into an electrical signal. The time delay between the excitation pulse (current pulse) applied to one end of the tube and the magnetostrictive return represents the position of the position marker (permanent magnet).

Conventional magnetostrictive transducers have the drawback that they have to provide an outgoing path for the current inside the tube (along the copper conductor) and a return path for the same current through a copper conductor which constitutes a closed path together with the copper conductor that carries the outgoing current pulse.

Therefore, since an outgoing path and a return path are required, it is necessary to provide a copper conductor for the outgoing path and a similar conductor, connected thereto, for the return path. This entails constructive difficulties for the magnetostrictive transducer, also in view of the limited dimensions of said transducer.

Moreover, damping of the mechanical wave is very important, since if the wave that propagates toward one end of the tube, opposite to the end where the wave is to be detected, is not damped appropriately, wave reflections can occur which constructively or destructively interfere with the mechanical wave meant to be detected, accordingly interfering with the correct measurement.

Damping of the mechanical wave is entrusted exclusively to the presence of damping elements, such as for example silicone rubber dampers, which allow to damp the mechanical wave along the magnetostrictive tube, but sometimes this solution is not fully satisfactory.

SUMMARY OF THE INVENTION

The aim of the present invention is to provide a magnetostrictive transducer with high measurement precision which can be manufactured with a structure which is simplified with respect to conventional transducers.

Within the scope of this aim, an object of the present invention is to provide a magnetostrictive transducer with high measurement precision in which the mechanical wave is damped in an optimum manner in order to avoid interfering with the measurement provided by the transducer.

Another object of the present invention is to provide a magnetostrictive transducer with high measurement precision in which the external vibrations to which the transducer can be subjected do not affect measurement precision at all or at the most minimally.

Another object of the present invention is to provide a magnetostrictive transducer with high measurement precision which is highly reliable, relatively easy to manufacture and at competitive costs.

This aim, these objects and others which will become apparent hereinafter are achieved by a magnetostrictive transducer with high measurement precision, comprising a containment tube which accommodates a magnetostrictive tube inside which a conducting wire is accommodated, transducer means being provided at one end of said magnetostrictive tube, means for detecting the signal acquired by said transducer means being connected to said transducer means, characterized in that said magnetostrictive tube is connected to said containment tube by conducting means which are suitable to provide electrical continuity between said conducting wire accommodated in said magnetostrictive tube and said containment tube.

BRIEF DESCRIPTION OF THE DRAWINGS

Further characteristics and advantages of the present invention will become apparent from the following detailed description of a preferred but not exclusive embodiment of the transducer according to the invention, illustrated only by way of non-limitative example in the accompanying drawing, wherein:

FIG. 1 is a sectional view of the magnetostrictive transducer according to the invention, in which however the permanent magnets suitable to provide the magnetostrictive effect are not shown; and FIG. 2 is a detailed sectional view of portions of FIG. 1.

DESCRIPTION OF THE PREFERRED EMBODIMENTS

With reference to the above figures, the magnetostrictive transducer according to the invention, generally designated by the reference numeral 20, comprises an outer metallic containment tube 1 which constitutes the enclosure for containing the actual magnetostrictive transducer; said tube internally accommodates a tube made of magnetostrictive material 2, which in turn internally accommodates a conducting wire 3, preferably made of copper, which is meant to carry the current pulse from one end to the other of the magnetostrictive tube 2.

One of the particularities of the invention consists in that the return path of the current that flows through the conductor 3 is provided by the external containment tube 1, which is made of nonmagnetic metallic material. For this purpose, a connection is provided between the tube 2 made of magnetostrictive material and the containment tube 1 that accommodates the tube 2. The connection is provided by conducting means which are suitable to provide electrical continuity between the copper conductor 3 and the outer tube 1. The conducting means can be provided, for example, by a closure and contact plug 4 which is arranged at the end of the containment tube 1 that lies opposite the end at which current is fed into the conducting wire 3.

At the end of the containment tube 1 where the closure plug 4 is provided damping means 5 are also provided, made for example of silicone rubber, which are arranged around the magnetostrictive tube 2 so as to damp the mechanical waves transmitted along the magnetostrictive tube 2 toward the opposite end with respect to the end where the mechanical waves are to be actually detected and transduced into electrical signals.

In order to further damp these waves, the magnetostrictive tube 2 is provided with at least one notch 6 formed between the damping means 5 and the closure plug 4, so that the magnetostrictive tube 2 becomes axially rigid and is torsionally deformable.

For this purpose it is possible to provide a pair of notches 6 arranged substantially so as to face each other and be mutually staggered.

A silicone centering tube 7 is also provided which is arranged between the containment tube 1 and the magnetostrictive tube 2; the silicone centering tube is conveniently partially clamped around the magnetostrictive tube 2 by means of clamping rings 8 which are arranged at intervals along the extension of the magnetostrictive tube 2.

At the end of the containment tube 1 that lies opposite the end where the closure plug 4 is provided, there are signal transducer means which are suitable to detect the mechanical waves that propagate along the magnetostrictive tube 2 following the injection of a current pulse along the copper conductor 3.

The transducer means conveniently comprise a coil 9 which is arranged around the magnetostrictive tube 2 and is supported by a supporting element 10. Conveniently, the coil 9 is contained within a containment element 11 which is arranged at the tip end of the containment tube 1 and to which a printed circuit 12 is connected; a connector 13 is connected to said printed circuit in order to provide connection to means for receiving the return signal acquired by the transducer means 9.

The copper conducting wire 3 protrudes from the end of the containment tube 1 that is connected to the printed circuit 12 and allows to apply, at its end 14, a current pulse to the conducting wire 3, which pulse accordingly propagates along the conductor until it reaches the opposite end of the magnetostrictive tube 2.

In practice, the application of the current pulse to the end 14 of the conductor 3 allows to instantaneously produce a circular magnetic field along the magnetostrictive tube 2. The use of a permanent magnet (or of a plurality of magnets) arranged so that their axis is perpendicular to the axis of the magnetostrictive tube 2 allows to have field lines which are perpendicular to the field generated in the magnetostrictive tube 2. Exactly at the point that corresponds to the center of the magnet, from which its lines of force extend radially and diverge, an interaction occurs between the magnetic fields generated by the magnet and by the current that flows through the magnetostrictive tube 2; this interaction causes, by magnetostrictive effect, a torsional elastic deformation, i.e., a torsional mechanical wave is produced which propagates, with opposite signs, in both directions of said magnetostrictive tube.

At one end, and specifically at the end where the damping means 5 and the notches 6 are provided, the mechanical wave is damped, while at the opposite end the mechanical wave is detected by the transducer means 9, which convert it into a suitable electrical signal. The delay between the excitation pulse fed into the conductor 3 and the magnetostrictive return, taking into account the (known) propagation velocity of the mechanical wave, gives an indication of the position of the permanent magnets along the extension of the containment tube 1.

The transducer according to the invention therefore allows to provide for the return of the excitation current pulse along the containment tube 1 instead of along a return conducting wire similar to the conductor in which the pulse is propagated, by the fact that the magnetostrictive tube is connected to the conductor by means of the closure plug 4.

Moreover, the damping of the mechanical wave is facilitated not only by the presence of damping means 5 but also by the presence of the notch or notches 6, which allow to make the magnetostrictive tube torsionally movable and axially rigid.

The substantially complete damping of the mechanical waves that propagate toward the distal end of the magnetostrictive tube 2, i.e., toward the opposite end with respect to the end where the current pulse is injected, allows to avoid having mechanical return waves which can interfere with the mechanical return wave detected by the transducer means 9, accordingly avoiding any biasing of the measurement of the magnetostrictive transducer.

The delay between the current pulse injected into the conductor 3 and the mechanical wave, detected by the transducer means 9, in fact represents the position assumed by the permanent magnet along the extension of the containment tube 1. If the delay is biased in any way, either due to external disturbances or due to the interference of mechanical waves, the detected measurement will be inaccurate.

In practice it has been observed that the magnetostrictive transducer according to the invention fully achieves the intended aim and objects, since it allows to simplify the constructive structure of said transducer, avoiding a return path for the current pulse and utilizing instead the external containment tube, further providing additional means for damping the mechanical wave generated due to the application of a current pulse.

The transducer thus conceived is susceptible of numerous modifications and variations, all of which are within the scope of the inventive concept; all the details may also be replaced with other technically equivalent elements.

In practice, the materials employed, so long as they are compatible with the specific use, as well as the dimensions, may be any according to requirements and to the state of the art.

The disclosures in Italian Patent Application No. MI99A001313 from which this application claims priority are incorporated herein by reference.

What is claimed is:

1. A magnetostrictive position measuring device with high measurement precision, comprising:
    a containment tube which accommodates a magnetostrictive tube inside which a conducting wire is accommodated;
    transducer means being provided at one end of said magnetostrictive tube;
    means for evaluating a signal acquired by said transducer means being connected to said transducer means;
    means for damping mechanical waves generated following the application of a current pulse to said conducting wire; said means being arranged at the end of said magnetostrictive tube opposite to the end to which said current pulse is applied and comprising at least one notch formed on the outer surface of said magnetostrictive tube; and wherein said magnetostrictive tube is connected to said containment tube by conducting means which are suitable to provide electrical continuity between said conducting wire accommodated in said magnetostrictive tube and said containment tube.

2. A magnetostrictive position measuring device according to claim 1, wherein said magnetostrictive tube is accommodated within a silicone centering tube.

3. A magnetostrictive position measuring device according to claim 2, wherein said centering tube is partially clamped around said magnetostrictive tube by means of clamping rings arranged in a spaced configuration along said magnetostrictive tube, in order to support said magnetostrictive tube so that said magnetostrictive tube floats within said containment tube.

4. A magnetostrictive position measuring device according to claim 1, wherein said means for damping mechanical waves comprise two mutually staggered notches which are arranged substantially on two parallel planes and are formed on the outer surface of said magnetostrictive tube, between said means for damping mechanical waves and said means for electrical contact between said magnetostrictive tube and said containment tube.

5. A magnetostrictive position measuring device with high measurement precision, comprising:

a containment tube accommodating a magnetostrictive tube inside which a conducting wire is accommodated;

transducer means being provided at one end of said magnetostrictive tube for acquiring and evaluating a position signal;

conducting means connecting said magnetostrictive tube to said containment tube and providing electrical continuity between said conducting wire accommodated in said magnetostrictive tube and said containment tube;

means for damping mechanical waves generated following the application of a current pulse to said conducting wire; said means being arranged at the end of said magnetostrictive tube opposite to the end to which said current pulse is applied; said means comprising two mutually staggered notches arranged on two parallel planes and formed on the outer surface of said magnetostrictive tube between said means for damping mechanical waves and said means for electrical contact between said magnetostrictive tube and said containment tube.

6. A magnetostrictive position measuring device according to claim 5, wherein said magnetostrictive tube is accommodated within a silicone centering tube.

7. A magnetostrictive position measuring device according to claim 6, wherein said centering tube is partially clamped around said magnetostrictive tube by means of clamping rings arranged in a spaced configuration along said magnetostrictive tube, in order to support said magnetostrictive tube so that said magnetostrictive tube floats within said containment tube.

* * * * *